United States Patent
Park et al.

(10) Patent No.: US 11,401,490 B2
(45) Date of Patent: Aug. 2, 2022

(54) BEER PRODUCTION CONTAINER, AND BEER PRODUCTION DEVICE COMPRISING SAME

(71) Applicant: LG ELECTRONICS INC., Seoul (KR)

(72) Inventors: Sunyoung Park, Seoul (KR); Chungook Chong, Seoul (KR); Heeyeon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 835 days.

(21) Appl. No.: 16/318,477

(22) PCT Filed: Jul. 5, 2017

(86) PCT No.: PCT/KR2017/007196
§ 371 (c)(1),
(2) Date: Jan. 17, 2019

(87) PCT Pub. No.: WO2018/016779
PCT Pub. Date: Jan. 25, 2018

(65) Prior Publication Data
US 2019/0292499 A1 Sep. 26, 2019

Related U.S. Application Data

(60) Provisional application No. 62/363,326, filed on Jul. 17, 2016.

(30) Foreign Application Priority Data

Aug. 29, 2016 (KR) .................. 10-2016-0110346

(51) Int. Cl.
*C12C 13/10* (2006.01)
*B65D 25/08* (2006.01)
(Continued)

(52) U.S. Cl.
CPC ............. *C12C 13/10* (2013.01); *B65D 25/08* (2013.01); *B65D 51/28* (2013.01); *B65D 81/32* (2013.01); *B65D 85/72* (2013.01); *B65D 2555/02* (2013.01)

(58) Field of Classification Search
CPC .... B65D 2555/02; B65D 81/32; B65D 25/08; B65D 51/28; B65D 85/72; C12C 13/10
See application file for complete search history.

(56) References Cited

U.S. PATENT DOCUMENTS 4,070,133 A   1/1978   McCormick
4,708,938 A   11/1987  Hickinbotham
(Continued)

FOREIGN PATENT DOCUMENTS

JP   H 10-313848        12/1998
JP   H10313848 A    *   12/1998
(Continued)

OTHER PUBLICATIONS

U.S. Office Action dated Jun. 4, 2021 issued in U.S. Appl. No. 15/651,881.
(Continued)

*Primary Examiner* — Dana Ross
*Assistant Examiner* — Kuangyue Chen
(74) *Attorney, Agent, or Firm* — Ked & Associates, LLP (57) ABSTRACT

The present embodiment comprises: a container, having a hollow part formed at the top part thereof and an inner space, in which the main ingredients of beer are filled, formed in the side thereof; and a cap assembly which opens and closes the hollow part and is locked by means of a multistage lock, and which accommodates therein an additive bag in which an additive is filled. Therein, the container may comprise a perforation part that perforates the additive bag, and a through-hole part through which pass water, and additive (Continued)

and beer, the embodiment having the benefit of enabling the multistage fermentation of beer by means of a simple structure.

11 Claims, 7 Drawing Sheets

(51) Int. Cl.
*B65D 51/28* (2006.01)
*B65D 85/72* (2006.01)
*B65D 81/32* (2006.01)

(56) References Cited

U.S. PATENT DOCUMENTS

| | | | |
|---|---|---|---|
| 5,285,718 | A | 2/1994 | Webster |
| 6,119,767 | A * | 9/2000 | Kadota ............... F28D 15/0233 165/104.33 |
| 7,819,286 | B2 | 10/2010 | Antheil |
| 8,601,936 | B2 | 12/2013 | Williams |
| 9,228,163 | B1 | 1/2016 | Mitchell |
| 10,448,778 | B2 | 10/2019 | Watson |
| 10,808,213 | B2 | 10/2020 | Park |
| 2003/0071067 | A1 | 4/2003 | Sluijter |
| 2003/0222102 | A1 | 12/2003 | Cho |
| 2010/0018994 | A1 | 1/2010 | Antheil |
| 2010/0129490 | A1 | 5/2010 | Williams |
| 2014/0072678 | A1 | 3/2014 | Jenkins |
| 2016/0201018 | A1 | 7/2016 | Watson |
| 2017/0267511 | A1 | 9/2017 | Valles |
| 2017/0332829 | A1* | 11/2017 | Kim ........................ B67D 1/00 |
| 2019/0039875 | A1 | 2/2019 | Ware |
| 2019/0358596 | A1 | 11/2019 | Sobottka |
| 2020/0056129 | A1 | 2/2020 | Scheller |

FOREIGN PATENT DOCUMENTS

| | | |
|---|---|---|
| JP | 2007-290755 | 11/2007 |
| JP | 2007290755 A * | 11/2007 |
| JP | 2015-156815 | 9/2015 |
| KR | 20-0319526 | 6/2003 |
| KR | 10-2004-0045269 | 6/2004 |
| KR | 10-0777140 | 11/2007 |
| KR | 10-2009-0041266 | 4/2009 |
| KR | 10-1033113 | 5/2011 |
| KR | 20-2011-0011527 | 12/2011 |
| KR | 10-2016-0018206 | 2/2016 |
| WO | WO 9913049 | 3/1999 |

OTHER PUBLICATIONS

U.S. Final Office Action dated Jul. 23, 2020 issued in U.S. Appl. No. 15/651,881.
U.S. Office Action dated Mar. 23, 2020 issued in U.S. Appl. No. 15/651,831.
Korean Notice of Allowance dated May 28, 2020 issued in Application No. 10-2016-0174216.
International Search Report (with English Translation) and Written Opinion dated Nov. 10, 2017 issued in Application No. PCT/KR2017/007196.
Karl F. Lutzen et al.: "The Home Brewery" In: "Chemistry—A European Journal", Jan. 8, 1996 (Jan. 8, 1996), Wiley—V C H Verlag GmbH & Co. KGaA, DE, XP055664965, vol. 19, pp. 6-16.
European Search Report dated Feb. 11, 2020 issued in Application No. 17831252.6.
Korean Office Action dated Dec. 30, 2019 issued in Application No. 10-2016-0174216.
Korean Office Action dated Dec. 16, 2019 issued in Application No. 10-2016-0110346.
U.S. Office Action dated Feb. 5, 2020 issued in U.S. Appl. No. 15/651,881.

* cited by examiner

BEER PRODUCTION CONTAINER, AND BEER PRODUCTION DEVICE COMPRISING SAME

CROSS-REFERENCE TO RELATED PATENT APPLICATIONS

This application is a U.S. National Stage Application under 35 U.S.C. §371 of PCT Application No. PCT/KR2017/007196, filed Jul. 5, 2017, which claims priority to U.S. Provisional Application No. 62/363,326 filed Jul. 17, 2016 and Korean Patent Application No. 10-2016-0110346, filed Aug. 29, 2016, whose entire disclosures are hereby incorporated by reference.

TECHNICAL FIELD

The present invention relates to a beer production container and a beer production device having the same and, more particularly, to a beer production container capable of fermenting beer ingredients to produce beer, and a beer production device having the same.

BACKGROUND ART

Beer is produced by juicing and filtering malt, adding hops and performing fermentation with yeast.

Consumers may purchase ready-made beer produced by beer makers or make homemade beer (craft beer) produced by directly fermenting beer ingredients in the home or at a bar.

A variety of types of homemade beer may be made as compared to ready-made beer and may be produced according to consumer tastes.

Beer ingredients may include water, malt, hops, yeast and flavor additives.

Yeast may be added to malt to ferment malt and may help produce alcohol and carbonic acid.

Flavor additives include fruits, syrup and vanilla beans and enhance the taste of beer.

In general, homemade beer may be produced through a total of three steps including a wort production step, a fermentation step and a maturing step. It may take about two to three weeks from the wort production step to the maturing step.

In homemade beer, it is important to maintain an optimal temperature in the maturing step. In addition, by easily manufacturing homemade beer, it is possible to increase user convenience.

Recently, a beer production device capable of easily producing homemade beer in the home or at a bar has become widespread. Such a beer production device is preferably configured to be conveniently used while maintaining an optimal temperature for fermenting beer.

DISCLOSURE

Technical Problem

An object of the present invention is to provide a beer production container capable of fermenting beer in multiple stages using a simple structure, a beer production device having the same.

Another object of the present invention is to provide a beer production container, into which beer additives are easily put, and a beer production device having the same.

Technical Solution

A beer production container according to the present invention includes an inner chamber having a space formed therein, an insulation member surrounding the inner chamber, a door configured to open and close the space, a beer production container received in the space, a water supply module configured to supply water into the beer production container, and a temperature controller configured to control a temperature of the space.

The beer production container include a container having a hollow portion formed on an upper portion thereof and having formed therein an inner space, in which main beer ingredients are received, and a cap assembly configured to open and close the hollow portion, locked in multiple stages, and having received therein an additive cap, in which additives are received, a perforation portion configured to perforate the additive bag is formed in the container, and a through-hole, through which water, beer and additives pass, is formed in the container.

The container may include an inner body having the perforation portion protruding therefrom and the through-hole formed around the perforation portion.

The inner body may be disposed above the hollow portion.

The cap assembly may include a first cap threadedly engaged with the hollow portion and having a cap hollow portion formed on an upper portion thereof and a second cap threadedly engaged with the cap hollow portion and covering the cap hollow portion.

The additive bag may be fixed to at least one of the first cap and the second cap.

The additive bag may have a smaller size than the cap hollow portion and may be received in the cap hollow portion.

The additive bag may be fixed to the second cap.

The water supply module may include a water tank having water received therein, a water supply pump configured to pump the water of the water tank, and a water supply heater configured to heat the water pumped by the water supply pump.

The beer production device may further include a water supply valve configured to control water passing through the water supply heater.

The beer production device may further include a water supply hose connected to the water supply valve to guide water passing through the water supply valve into the inner chamber.

The temperature controller may include a thermoelectric element having a heat absorption body and a heat radiation body, a circulation fan configured to circulate air of the space to the heat absorption body, and a cooling fan configured to cool the heat radiation body.

Advantageous Effects

According to the present invention, it is possible to conveniently put additives into a container after primary fermentation of main beer ingredients and to more conveniently produce beer.

In addition, since a water supply module can supply hot water into the container, a user can more conveniently produce beer.

In addition, beer can be fermented at an optimal low temperature by cold air circulated in an inner chamber.

BEST MODE

Hereinafter, embodiments of the present invention will be described in detail with reference to the drawings.

Figure 1:
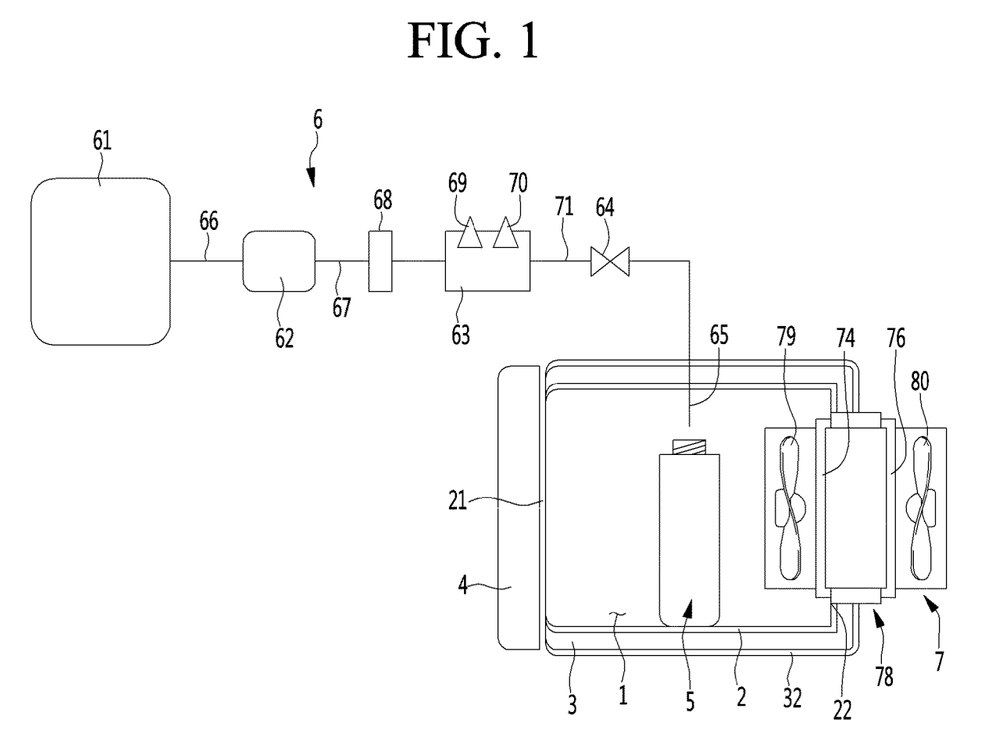
FIG. 1 is a view showing the configuration of a beer production device having a beer production container according to an embodiment of the present invention.
Figure 2:
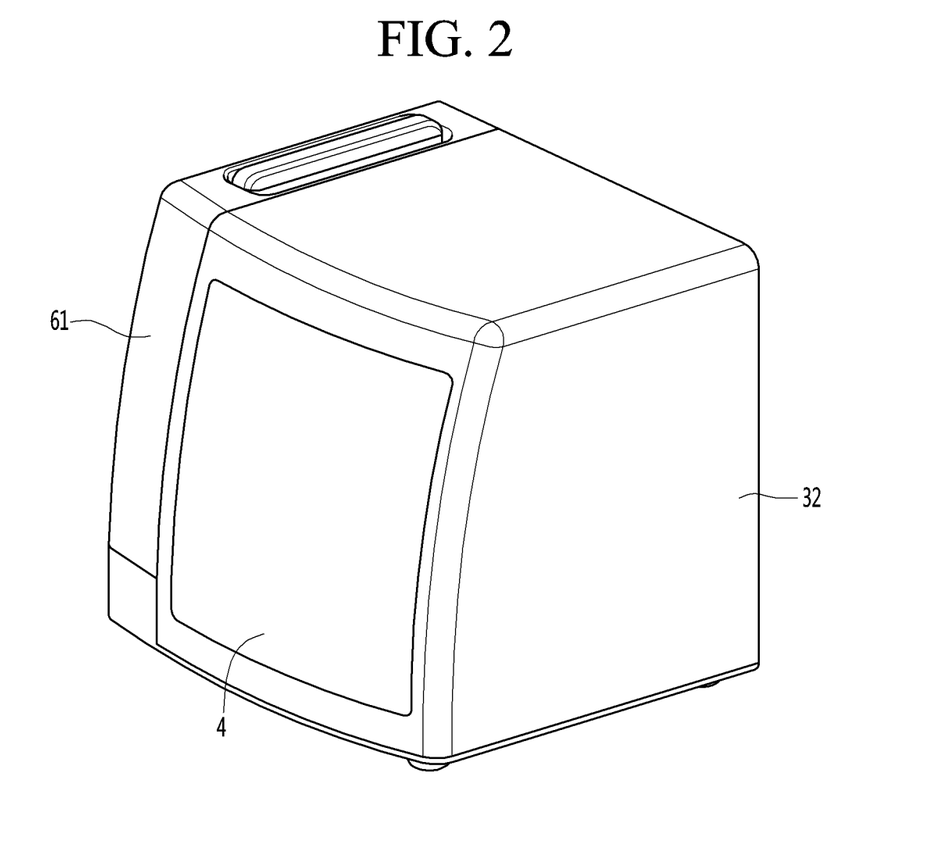
FIG. 2 is a perspective view showing a beer production device having a beer production container according to an embodiment of the present invention.
Figure 3:
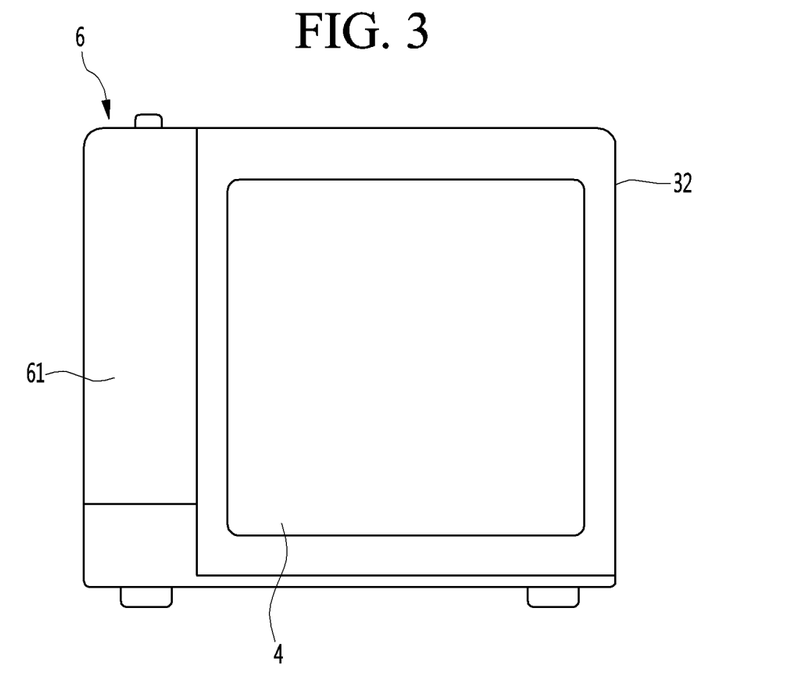
FIG. 3 is a front view showing a beer production device having a beer production container according to an embodiment of the present invention.
Figure 4:
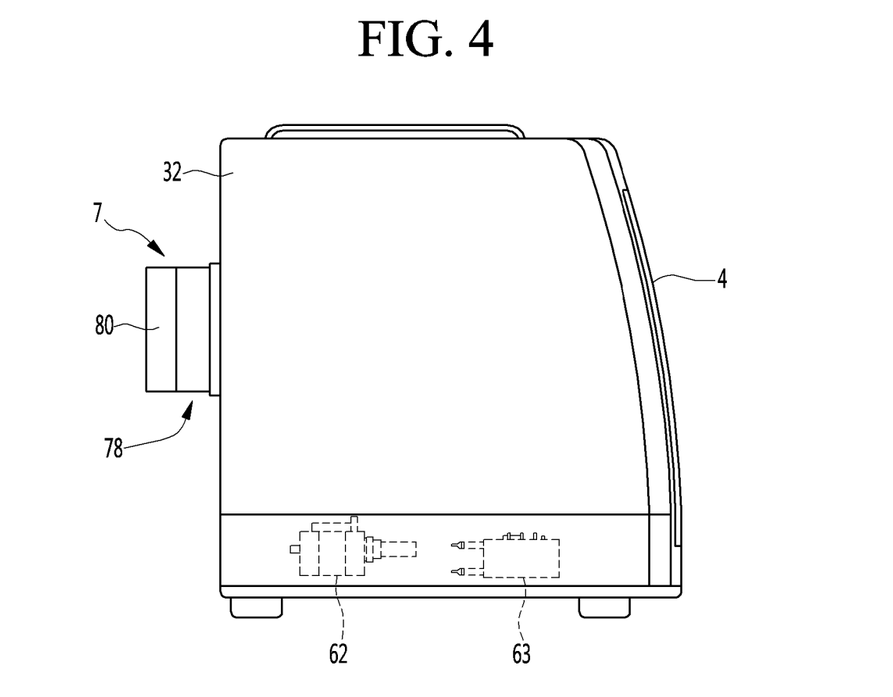
FIG. 4 is a side view showing a beer production device having a beer production container according to an embodiment of the present invention.

FIG. 1 is a view showing the configuration of a beer production device having a beer production container according to an embodiment of the present invention, FIG. 2 is a perspective view showing a beer production device having a beer production container according to an embodiment of the present invention, FIG. 3 is a front view showing a beer production device having a beer production container according to an embodiment of the present invention, and FIG. 4 is a side view showing a beer production device having a beer production container according to an embodiment of the present invention.

The present embodiment includes an inner chamber 2 having a space 1 formed therein, an insulation member 3 surrounding the inner chamber 2, a door 4 for opening and closing the space 1, a beer production container 5 received in the space 1, a water supply module 6 for supplying water to the beer production container 5, and a temperature controller 7 for controlling the temperature of a space S.

The inner chamber 2 may be formed such that the beer production container 5 is put thereinto or taken out therefrom through one surface thereof. The inner chamber 2 may be formed in a polygonal shape. A front surface 21 of the inner chamber 2 may be opened. The upper, lower, left and right and rear surfaces of the inner chamber 2 may be closed. The temperature controller 7 may be installed on a surface other than the front surface of the inner chamber 2. A temperature controller through-hole 22, through which the temperature controller 7 penetrates, may be formed in the inner chamber 2. The temperature controller through-hole 22 may be formed in a surface other than the first surface of the inner chamber 2.

The insulation member 3 may be made of foamed plastic. The insulation member 3 may surround the surfaces other than the front surface of the inner chamber 2. The insulation member 3 may be disposed to surround the upper, lower, left, right and rear surfaces of the inner chamber 2.

The beer production device may further include an outer case 32 surrounding the insulation member 3. The outer case 32 may form the appearance of the beer production device.

The door 4 may open and close the front surface of the inner chamber 2. The door 4 may be hinged to at least one of the inner chamber 2 and the outer case 32.

The beer production container 5 may have a smaller size than the space 1 of the inner chamber 2. The beer production container 5 may be placed on the lower plate of the inner chamber 2. Main beer ingredients and additives may be received in the beer production container 5 separately from each other and may be mixed as beer is fermented. The beer production container 5 may be configured to be detachable from the beer production device.

The beer production container 5 may be placed at a position where water may be received from the water supply module 6 and water supplied from the water supply module 6 may be dropped into the beer production container 5 in the inner chamber 2.

The water supply module 6 may include a water tank 61 in which water is stored, a water supply pump 62 for pumping water of the water tank 61, and a water supply heater 63 for heating water pumped by the water pump 62. The water supply module 6 may further include a water supply valve 64 for controlling water passing through the water supply heater 63. The water supply module 6 may further include a water supply hose 65 connected to the water supply valve 64 to guide water passing through the water supply valve 64 into the inner chamber 2.

A water tank outlet channel 66 may be connected to the water tank 61 and the water supply pump 62 may be connected to the water tank outlet channel 66.

A water supply pump outlet channel 67 may be connected to the water supply pump 62 and the water supply heater 63 may be connected to the water supply pump outlet channel 67.

In the water pump outlet channel 67, a flowmeter 68 for measuring the flow rate of the water supply pump outlet channel 67 may be installed.

The water supply heater 63 may be a mold heater. The water supply heater 63 may include a heater case, through which water pumped by the water supply pump 62 passes, and a heater provided in the heater case to heat water introduced into the heater case. In the water supply heater 63, a thermistor 69 for measuring the temperature of the water supply heater 63 may be installed. In the water supply heater 63, a thermal fuse 70 for cutting off a circuit to block current applied to the water supply heater 63 when a temperature is high may be installed in the water supply heater 63.

The water supply heater 63 may be connected to the water supply valve 64 and the water supply heater outlet channel 71.

One end of the water supply hose 65 may be connected to the water supply valve 64. The water supply hose 65 may penetrate through the inner chamber 2. The other end of the water supply hose 65 may be located inside the inner chamber 2.

When the water supply pump 62 is driven, water of the water tank 61 may be guided to the water supply heater 63 through the water tank outlet channel 66, the water supply pump 62 and the water supply pump outlet channel 67, and water guided to the water supply heater 63 may pass through the water supply valve 64 after being heated in the water supply heater 63. Water which has passed through the water supply valve 64 may be dropped into the space 1 of the inner chamber 2 through the water supply hose 65.

The beer production container 5 may be located under the other end of the water supply hose 65 in a state in which a cap assembly is detached, and water dropped from the water supply hose 65 may be supplied into the beer production container 5 in the inner chamber 2.

The temperature controller 7 may include a thermoelectric element 78 having a heat absorption body 74 and a heat radiation body 76, a circulation fan 79 for circulating air of the space 1 to the heat absorption body 74, and a cooling fan 80 for cooling the heat radiation body 80.

The beer production device having the beer production container may further include an input unit for enabling a user to input various types of commands and a controller for controlling the water supply module 5 and the temperature controller 7 according to input of the input unit.

Figure 5:
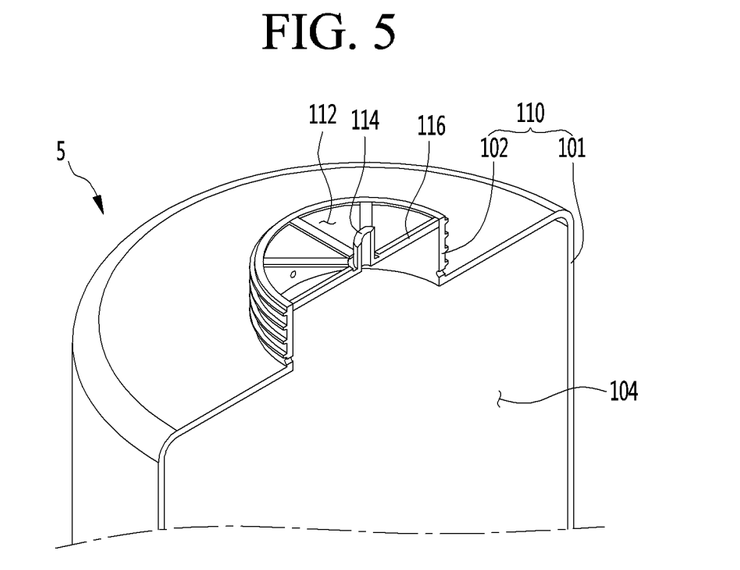
FIG. 5 is a partial cross-sectional view of a beer production container according to an embodiment of the present invention, into which water is supplied.
Figure 6:
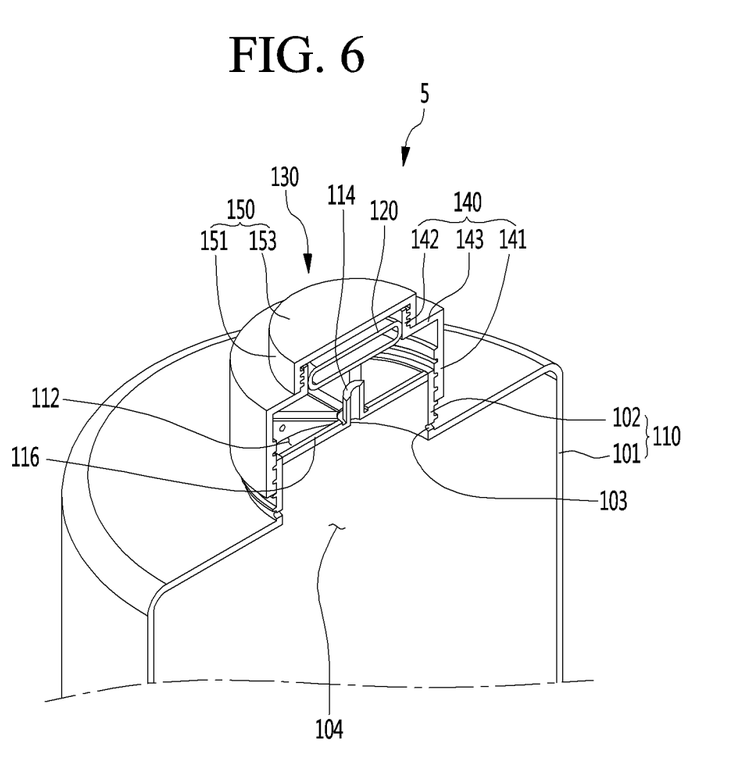
FIG. 6 is a cross-sectional view of a beer production container according to an embodiment of the present invention, which is primarily locked.
Figure 7:
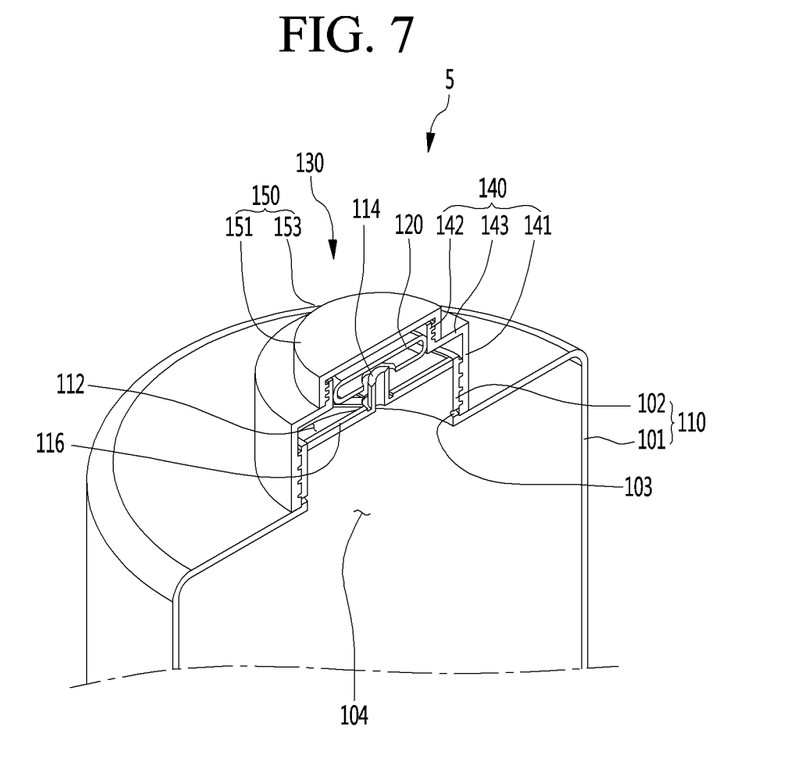
FIG. 7 is a cross-sectional view of a beer production container according to an embodiment of the present invention, which is secondarily locked.

FIG. 5 is a partial cross-sectional view of a beer production container according to an embodiment of the present invention, into which water is supplied, FIG. 6 is a cross-sectional view of a beer production container according to an embodiment of the present invention, which is primarily locked, and FIG. 7 is a cross-sectional view of a beer production container according to an embodiment of the present invention, which is secondarily locked.

The beer production container 5 may include a container 110 and a cap assembly 130.

A hollow portion 102 may be formed on the upper portion of the container 110. An inner space 104 in which main beer ingredients are received may be formed in the container 110.

The cap assembly 130 may open and close the hollow portion 102. The cap assembly 130 may be locked to the container 110 in multiple stages. The cap assembly 130 may include an additive bag 120 in which additives are received. The additive bag 120 may be received in the cap assembly 130.

The container 110 may include a container body 101 and a hollow portion 102.

The inner space 104 may be formed in the container body 101.

The hollow portion 102 may protrude from the upper side of the container body 101. The hollow portion 102 may have a smaller size than the container body 101.

At least one pore 103 may be formed in the hollow portion 102. The pore 103 may be formed such that gas of the inner space 104 is discharged to the outside through the hollow portion 103. The pore 103 may be formed at an openable and closable position of the cap assembly 130. The pore 103 may be opened in a direction perpendicular to the opening direction of the hollow portion 102. The hollow portion 102 may be opened in a vertical direction and the pore 103 may be opened in a horizontal direction. The pore 103 may be opened at the time of primary fermentation of beer, thereby discharging gas to the outside. The pore 103 may be closed at the time of secondary fermentation of beer, thereby aiding in generating carbon dioxide gas in beer.

The beer production container 5 may be used in a state in which main beer ingredients are received in the inner space 104.

The main beer ingredients may be received in the inner space 104 in the form of powder. The main beer ingredients received in the inner space 104 may include powered malt obtained by drying and grinding wort. In addition, the main beer ingredients received in the inner space 104 may include powdered yeast obtained by drying and grinding yeast.

That is, the main beer ingredients received in the container 110 in advance may include powered malt and powered yeast.

A through-hole 112, through which water or additives used to produce beer may pass, or through which produced beer may pass, may be formed in the container 110. In addition, a perforation portion 114 capable of perforating the additive bag 120 may be formed in the container 110. The container 110 may include an inner body 116 in which the through-hole 112 and the perforation portion 114 are formed. The inner body 116 may be disposed on the upper side of the hollow portion 102.

The perforation portion 114 may protrude from the inner body 116 in a direction opposite to the inner space 104. The perforation portion 114 may protrude upward from the inner body 116. The through-hole 112 may be formed around the perforation portion 114.

Water or additives used to produce beer may be supplied into the inner space 104 through the through-hole 112. In addition, the perforation portion 114 may be provided to perforate the additive bag 120 in the middle of producing beer.

When the cap assembly 130 covers the inner body 116, the inner body 116 may be covered by the cap assembly 130 and, when the cap assembly 130 is detached from the container 110, the inner body 116 may be exposed to the outside.

The container 110 may be located under the other end of the water supply hose 65 shown in FIG. 1 in a state of being detached from the cap assembly 130, and water supplied from the water supply hose 65 may be dropped into the inner space 104 after sequentially passing through the through-hole 112 and the hollow portion 102 and may be mixed with the main beer ingredients received in the inner space 104.

The cap assembly 130 may be composed of a combination of a plurality of members. As shown in FIG. 6, the cap assembly 130 may be locked in a first-stage state in which the additive bag 120 is not perforated by the perforation portion 114 and may be locked in a second-stage state in which the additive bag 120 is perforated by the perforation portion 114.

The cap assembly 130 may include a first cap 140 and a second cap 150.

The first cap 140 may be threadedly engaged with the hollow portion 102. A cap hollow portion 142 may be formed on the upper portion of the first cap 140.

The second cap 150 may be threadedly engaged with the cap hollow portion 142 and may cover the cap hollow portion 142.

The first cap 140 may include a circumference portion 141, in which a space larger than the hollow portion 102 is formed, and an upper plate 143 formed on the upper portion of the circumference portion 141.

The circumference portion 141 of the first cap 140 may be formed in a hollow cylindrical shape. The first cap 140 may cover the periphery of the hollow portion 102, and the circumference portion 141 of the first cap 140 may surround the outer circumferential surface of the hollow portion 102. A male screw may be formed on the outer circumferential surface of the hollow portion 102, and a female screw threadedly engaged with the male screw of the hollow portion 102 may be formed in the inner circumferential surface of the circumference portion 141 of the first cap 140.

The upper plate 142 of the first cap 140 may be formed in a hollow disc shape.

The cap hollow portion 142 may protrude from the upper plate 143 of the first cap 140 in a hollow cylindrical shape. The cap hollow portion 142 may have a smaller size than the hollow portion 102 of the first cap 140 and the circumference portion 141 of the first cap 140.

The first cap 140 may be primarily locked up to a height in which the pore 103 of the hollow portion 102 is not blocked as shown in FIG. 6 and may be secondarily locked up to a height in which the pore 103 of the hollow portion 102 is blocked as shown in FIG. 7.

The first cap 140 may be threadedly engaged up to a height in which the pore 103 of the hollow portion 102 is not blocked at the time of primary fermentation of beer and the first cap 140 may be threadedly engaged up to a height in which the pore 103 of the hollow portion 102 is blocked at the time of secondary fermentation of beer.

The second cap 150 may include a circumference portion 151 having a larger space than the cap hollow portion 142 and an upper plate 153 formed on the circumference portion 151.

The circumference portion 151 of the second cap 150 may be formed in a hollow cylindrical shape. When the second cap 150 covers the cap hollow portion 142, the circumference portion 151 of the second cap 150 may surround the outer surface of the cap hollow portion 142. A male screw may be formed on the outer circumferential surface of the cap hollow portion 142 and a female screw threadedly engaged with the male screw of the cap hollow portion 142 may be formed in the inner circumferential surface of the circumference portion 151 of the second cap 150.

The upper plate 153 of the second cap 150 may be formed in a disc shape. The upper plate 153 of the second cap 150 may cover the inside of the cap hollow portion 142 from the upper side of the cap hollow portion 142.

The additive bag 120 may be fixed to at least one of the first cap 140 and the second cap 150. The additive bag 120 may have a smaller size than the cap hollow portion 142 and may be received in the cap hollow portion 142. The additive bag 120 may be fixed to the second cap 150.

The additive bag 120 is not perforated by the perforation portion 114 at the time of first-stage locking and is perforated by the perforation portion 114 at the time of second-stage locking.

In the cap assembly 130, the second cap 150 may be threadedly engaged with the cap hollow portion 142 of the first cap 140 and the first cap 140 may be locked in two stages.

The additive bag 120 may be fixed to the upper plate 153 of the second cap 150.

When the first cap 140 is at a first-stage locking position, the additive bag 120 may be located at a height where the additive bag is not perforated by the perforation portion 114, as shown in FIG. 6.

When the first cap 140 is at a second-stage locking position, the additive bag 120 may be brought into contact with the perforation portion 114, as shown in FIG. 7. At this time, the additive bag may be perforated by the perforation portion 114.

The additives received in the additive bag 120 may produce carbonic acid at the time of fermentation like sugar or maltose and is preferably double sugar. The additives received in the additive bag 120 may not be mixed with the main beer ingredients at the time of primary fermentation of the main beer ingredients and may be mixed with the main beer ingredients at the time of secondary fermentation of the main beer ingredients, thereby producing carbonic acid.

That is, the cap assembly 130 has two locking heights, that is, a first locking height where the additive bag 120 is not perforated by the perforation portion 114 and the circumference portion 143 of the first cap 140 does not block the pore 103 and a second locking height where the additive bag 120 is perforated by the perforation portion 114 and the circumference portion 143 of the first cap 140 blocks the pore 103.

Hereinafter, operation of the present invention having the above configuration will be described.

First, a user may open the door 4 and put the container 110, in which malt powder and yeast powder are received, into the inner chamber 2. The user may locate the container 110 such that the hollow portion 102 of the container 110 is located under the other end of the water supply hose 65. The user may input a water supply mode to the input unit and the controller turns on the water supply pump 62, the water supply heater 63 and the water supply valve 64 when the water supply mode is received through the input unit.

When the water supply pump 62, the water supply heater 63 and the water supply valve 64 are turned on, water of the water tank 61 may be heated by the water supply heater 63 and then dropped to the hollow portion 102, and the hot water dropped to the hollow portion 102 may be mixed with the main beer ingredients in the container 110.

The controller may turn off the water supply pump 62, the water supply heater 63 and the water supply valve 64, when a set time or a set flow rate is reached after the water supply pump 62, the water supply heater 63 and the water supply valve 64 are turned on.

The user may take out the container 110 from the inner chamber 2 and shake the container 110, and the hot water supplied into the container 110 through the hollow portion 102 may be evenly mixed with the main beer ingredients received in the container 110.

The user may cover the cap assembly 130 on the hollow portion 102 after shaking the container 110.

The user may threadedly engage the circumference portion 151 of the second cap 150 with the cap hollow portion 142 of the first cap 140, thereby locking the first cap. At this time, the first cap 140 is not completely locked to the hollow portion 102, but is partially locked.

For example, when the first cap 140 is completely locked by turning the first cap 140 two rotations in a state in which the first cap 140 covers the hollow portion 102, the user may cover the hollow portion 102 on the first cap 140 and then turn the first cap 140 one rotation or half rotation. In this case, the additive bag 120 fixed to the second cap 150 may be located at a height where the additive bag is not perforated by the perforation portion 114 as shown in FIG. 6.

The user may put the container 110, to which the cap assembly 130 is locked in a first stage, into the inner chamber 2, close the door 4, and input a fermentation command to an operation unit.

The controller may control the temperature controller 7 and the temperature controller 7 may cool the space of the inner chamber 2. The controller may cool the inner chamber 2 for a set primary fermentation time, for example, 7 days, and notify the user that primary fermentation is completed through a buzzer after the set time has elapsed.

The user may open the door 4, take out the beer production container 5 from the inner chamber 2, and further turn the first cap 140 in a lock direction. As the first cap 140 further rotates in the lock direction, the second cap 150 moves down along with the additive bag 120, the perforation portion 114 may perforate the additive bag 120, and the additives in the additive bag 120 may be dropped into the container 110 through the hollow portion 102.

The user may shake the container 110 such that the additives dropped into the container 110 is mixed with the beer ingredients received in the container 110, put the container 110, to which the cap assembly 130 is locked, into the inner chamber 2 again, and close the door 4.

The controller may control the temperature controller 7 during a set secondary fermentation time. As the additives put into the container 110 may be fermented, carbonic acid may be generated.

When the set secondary fermentation time has elapsed, the user may open the door 4, take out the container 110, and detach the second cap 150 from the first cap 140 to open the cap hollow portion 142. The beer in the container 110 may sequentially pass through the hollow portion 102 and the cap hollow portion 142, thereby being discharged to the outside.

Meanwhile, the present invention is not limited to the above embodiment and the cap assembly may include a first cap threadedly engaged with the container 110 up to only a height where the pore 103 is not blocked without the additive bag received therein and a second cap selectively engaged with the first cap in the container 110, having the additive bag 120 received therein and capable of being threadedly engaged at a height where the pore 103 is blocked.

In this case, primary fermentation may be performed in a state in which the hollow portion 102 of the container 110 is blocked by the first cap. When primary fermentation is completed, secondary fermentation may be performed by detaching the first cap from the container 110 and then blocking the hollow portion 102 and the pore 103 of the container 110 by the second cap and putting the additives of the additive bag 120 received in the second cap into the container 110.

The above description is only illustrative of the technical idea of the present invention and those skilled in the art will appreciate that various modifications and variations can be made without departing from the essential characteristics of the present invention.

The above exemplary embodiments are therefore to be construed in all aspects as illustrative and not restrictive, and the range of the present invention is not limited by the embodiments.

The scope of the invention should be determined by the appended claims and their legal equivalents, and all changes coming within the meaning and equivalency range of the appended claims are intended to be embraced therein.

The invention claimed is:

1. A beer production device comprising:
   an inner chamber having a space formed therein;
   an insulation member surrounding the inner chamber;
   a door configured to open and close the space;
   a beer production container received in the space;
   a water supply module configured to supply water into the beer production container; and
   a temperature controller configured to control a temperature of the space,
   wherein the beer production container includes:
      a container having a hollow portion formed on an upper portion thereof and having formed therein an inner space, in which main beer ingredients are received; and
      a cap assembly configured to open and close the hollow portion, locked in multiple stages, and having received therein an additive bag, in which additives are received,
      wherein a perforation portion configured to perforate the additive bag is formed in the container, and
      wherein a through-hole, through which water, beer and additives pass, is formed in the container,
      wherein at least one pore is formed in the hollow portion,
      wherein the at least one pore is configured such that gas of the inner space is discharged through the hollow portion to outside of the container,
      wherein the at least one pore is formed at an openable and closable position of the cap assembly,
      wherein the at least one pore is opened in a direction perpendicular to an opening direction of the hollow portion.

2. The beer production device according to claim 1, wherein the container includes an inner body having the perforation portion protruding therefrom and the through-hole formed around the perforation portion.

3. The beer production device according to claim 2, wherein the inner body is disposed on an upper side of the hollow portion.

4. The beer production device according to claim 1,
   wherein the cap assembly includes:
   a first cap threadedly engaged with the hollow portion and having a cap hollow portion formed on an upper portion thereof; and
   a second cap threadedly engaged with the cap hollow portion and covering the cap hollow portion, and
   wherein the additive bag is fixed to at least one of the first cap and the second cap.

5. The beer production device according to claim 4, wherein the additive bag has a smaller size than the cap hollow portion and is received in the cap hollow portion.

6. The beer production device according to claim 5, wherein the additive bag is fixed to the second cap.

7. The beer production device according to claim 1, wherein the water supply module includes:
   a water tank having water stored therein;
   a water supply pump configured to pump the water of the water tank; and
   a water supply heater configured to heat the water pumped by the water supply pump.

8. The beer production device according to claim 7, further comprising a water supply valve configured to control water passing through the water supply heater.

9. The beer production device according to claim 7, further comprising a water supply hose connected to the water supply valve to guide water passing through the water supply valve into the inner chamber.

10. The beer production device according to claim 1, wherein the temperature controller includes:
    a thermoelectric element having a heat absorption body and a heat radiation body;
    a circulation fan configured to circulate air of the space to the heat absorption body; and
    a cooling fan configured to cool the heat radiation body.

11. A beer production device comprising:
    an inner chamber having a space formed therein;
    an insulation member surrounding the inner chamber;
    a door configured to open and close the space;
    a beer production container provided in the space;
    a water supply module configured to supply water into the beer production container; and
    a temperature controller configured to control a temperature of the space,
    wherein the beer production container includes:
       a container having a hollow portion and an inner space, the hollow portion is disposed at an upper portion of the container, and the inner space is disposed below the hollow portion; and a cap assembly configured to open and close the hollow portion, locked in multiple stages, and the cap assembly including an additive bag to provide additives, wherein the container includes a perforation portion configured to perforate the additive bag, wherein the container includes a through-hole configured to pass liquid or additives, wherein the hollow portion includes at least one pore configured to discharge gas from the inner space to outside of the hollow portion, wherein the at least one pore is disposed at an openable and closable position of the cap assembly, wherein the hollow portion has an opening direction and the at least one pore is opened at the hollow portion in a direction perpendicular to the opening direction of the hollow portion.

* * * * *